(12) United States Patent
Sugiyama

(10) Patent No.: US 7,142,795 B2
(45) Date of Patent: Nov. 28, 2006

(54) PROCESS UNIT

(75) Inventor: Tadashi Sugiyama, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 994 days.

(21) Appl. No.: 10/058,609

(22) Filed: Jan. 28, 2002

(65) Prior Publication Data

US 2003/0142362 A1    Jul. 31, 2003

(51) Int. Cl.
*G03G 21/16*    (2006.01)

(52) U.S. Cl. ................................ 399/111

(58) Field of Classification Search ............. 399/107, 399/108, 109, 110, 111, 113, 114, 116, 119
See application file for complete search history.

(56) References Cited

U.S. PATENT DOCUMENTS 6,163,665 A * 12/2000 Watanabe et al. ........... 399/111
6,163,666 A * 12/2000 Hosokawa et al. ......... 399/111
6,266,502 B1 * 7/2001 Matsuzaki et al. .......... 399/111

FOREIGN PATENT DOCUMENTS

JP    2001-075459 A    3/2001
JP    2001-125470 A    5/2001

* cited by examiner

*Primary Examiner*—Hoan Tran
(74) *Attorney, Agent, or Firm*—Frishauf, Holtz, Goodman & Chick, P.C.

(57) ABSTRACT

The process unit includes a drum unit configured to mount an image carrier which carries an electrostatic latent image, onto a casing, a holder cover configured to hold a side surface portion of the drum unit, a developer unit configured to mount a developer roller which develops the electrostatic latent image, onto the casing, a holder cover configured to hold a side surface portion of the developer unit, an aligning device having a recess portion formed in one of the holder covers of the drum unit and the developer unit, and a projecting portion formed on the other holder cover, which fit with the recess portion, and configured to align the drum unit with respect to the developer unit as the recess portion and the projecting portion are fit with each other, and a fixation tool configured to fix the engaged recess portion and projecting portion together.

16 Claims, 9 Drawing Sheets

PROCESS UNIT

BACKGROUND OF THE INVENTION

The present invention relates to a process unit which can be applied to, for example, a copy machine, a facsimile machine or a printer.

Process units of the above-described type each include a photosensitive drum. The surface of the photosensitive drum is charged with an electric charger, and then a laser beam corresponding to image data is irradiated onto the surface of the thus-charged photosensitive drum, thereby forming an electrostatic latent image. After that, toner is supplied onto the static latent image with a developer roller so as to form a toner image, which is then transferred onto a recording material such as a paper sheet. Toner remaining on the photosensitive drum is removed with a drum cleaner and collected.

The above-described photosensitive drum, electric charger and drum cleaner are held in a casing, which forms a drum unit, and the developer roller is held in another casing, which forms a developer unit.

Both side surface portions of each of the drum unit and developer unit are held with side surface covers, and a lower end portion of each of these side surface covers is fixed by screws to the bottom plate frame. Further, a back surface side of the drum unit is covered by a back surface cover.

Here, the side surface covers of the drum unit and developer unit are each designed to have such a structure that each cover can be divided into two to the drum unit side and developer unit side, for the purpose of improving ease of maintenance. When assembling the drum unit and developer unit, first, the drum unit is aligned with the developing unit, and then the side surface covers of the drum unit are fixed.

However, in a conventional unit, the position where the drum unit is aligned is different from the position where the drum unit is fixed. With this structure, even after the drum unit is positioned, it is sometimes displaced from the position when it is actually fixed. Therefore, the accuracy of the alignment is low.

In the meantime, the electric charger has a hook on each of its end portions, and each hook is engaged with the casing of the drum unit or a bearing portion located between the casing and the photosensitive drum. Thus, the charger is held and at the same time is aligned at the appropriate position.

Further, one end of the photosensitive drum is supported rotatably by one side surface portion of the casing via the bearing, whereas the other end is held rotatably by the other side surface portion of the casing via a holder which serves also as a bearing.

Moreover, the drum cleaner is supported by both its end portions on both side surface portions of the casing via support pins.

On the other hand, in a conventional apparatus, the hooks of the electric charger, the bearing holder of the photosensitive drum, and the support pins for the drum cleaner are provided on an inner side of the side surface cover. Due to such a structure, for maintenance for the electric charger, it is necessary to remove the side surface cover of the drum unit to disengage the hook and then remove the back surface cover so as to dismount the electric charger. The side surface covers also serve to hold the gears of the drum mechanism and the connection between the developer unit and the drum unit. With this structure, these units and parts such as gears must be dismounted when the side surface covers are removed, which is laborious.

Further, for maintenance of the photosensitive drum and drum cleaner, the side surface covers of the drum unit must be taken off after separating the drum unit and developer unit from each other, and then the photosensitive drum and drum cleaner must be dismounted by removing the holders and support pins, which is laborious as well.

As described above, the conventional technique entails such a drawback that it is very laborious to dismount the electrical charger, photosensitive drum or drum cleaner. Due to this drawback, at the end of the lifetime of the photosensitive drum, the entire drum unit must be, in many cases, discarded and replaced with a new unit. The life of the photosensitive drum is as long as or shorter than that of the electrical charger, and therefore it is very wasteful to replace the entire unit when only the drum needs replacing.

Apart from the above, conventionally, when spent drum units collected from users are to be subjected to maintenance or recycled, a great number of maintenance steps are required, thereby making it difficult to recycle them.

BRIEF SUMMARY OF THE INVENTION

The present invention has been proposed under the above-described circumstances, and the object thereof is to provide a process unit having a high aligning accuracy of the drum unit with respect to the developer unit as well as a high maintenance property of each of the electrical charger, image carrier and cleaning member.

According to the first aspect of the present invention, there is provided a process unit comprising: an image carrier unit configured to mount an image carrier which carries an electrostatic latent image, onto a casing; a holder cover configured to hold a side surface portion of the image carrier unit; a developer unit configured to mount a developer roller which develops the electrostatic latent image, onto the casing; a holder cover configured to hold a side surface portion of the developer unit; an aligning device including a recess portion formed in one of the holder covers of the image carrier unit and the developer unit, and a projecting portion formed on the other holder cover, which fit with the recess portion, and configured to align the image carrier unit with respect to the developer unit as the recess portion and the projecting portion are fit with each other; and a fixation tool configured to fix the engaged recess portion and projecting portion together.

According to the second aspect of the present invention, there is provided a process unit comprising: an image carrier unit configured to mount an image carrier which carries an electrostatic latent image, onto a casing; a holder cover configured to hold a side surface portion of the image carrier unit; a developer unit configured to mount a developer roller which develops the electrostatic latent image, onto the casing; a holder cover configured to hold a side surface portion of the developer unit; an electric charger device provided in the image carrier unit and configured to charge a surface of the image carrier; an aligning portion configured to align the charger device within the imager carrier unit; a cover member detachably mounted on the image carrier unit and configured to cover an opposite side of an image carrier side of the charger device; and an urging member provided on the cover member and configured to hold the charger device by urging it with pressure in the aligning portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
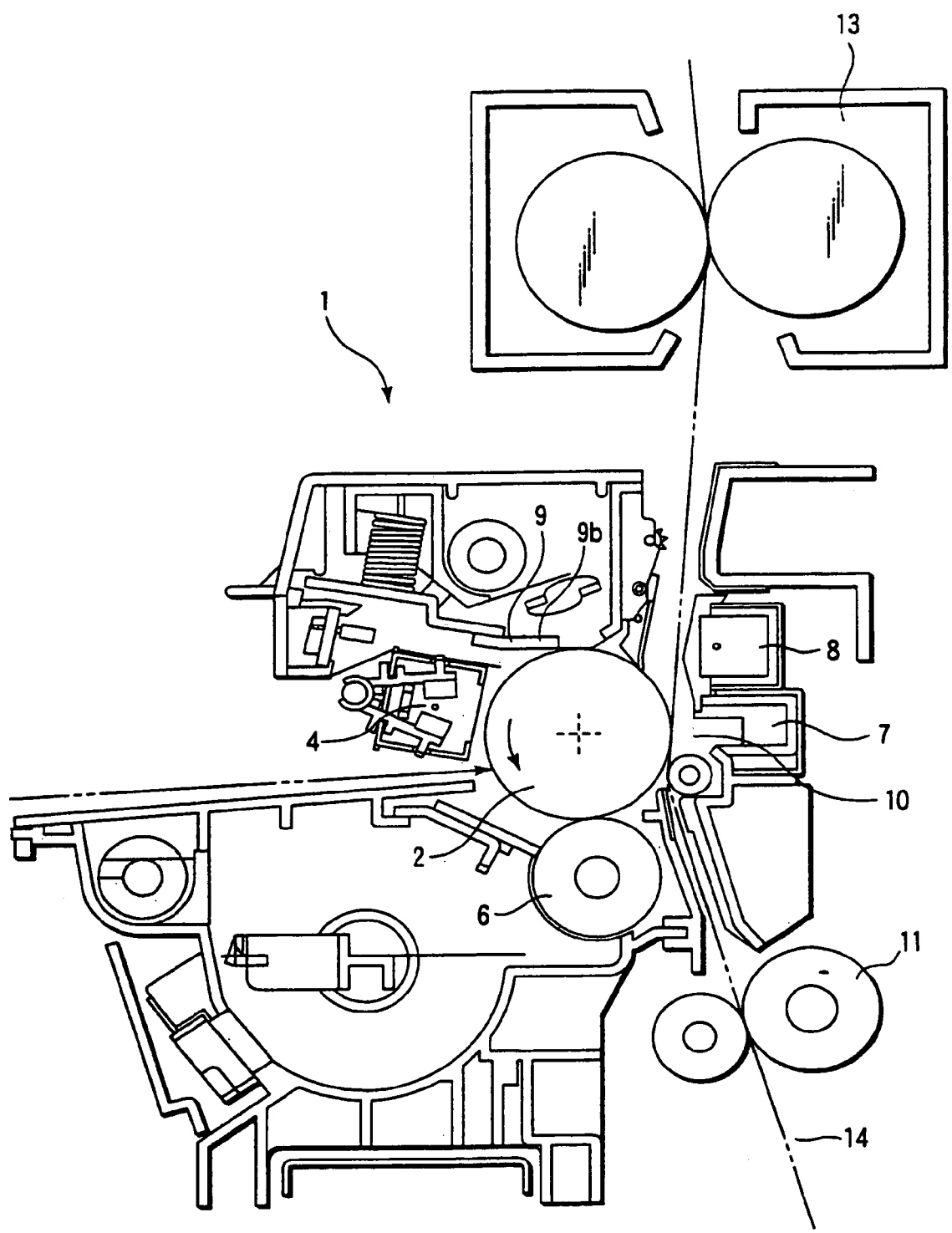
FIG. 1 is a diagram showing the structure of the image forming unit of an electronic photocopier according to an embodiment of the present invention.

FIG. 1 is a diagram showing the structure of an image forming unit 1 of an electronic photocopier according to an embodiment of the present invention.

The image forming unit 1 includes a photosensitive drum 2 serving as a rotatable image carrier. Around the photosensitive drum 2, there are provided along its rotation direction, an electrical charger 4, a developer roller 6, a transfer charger 6, a separation charger 8 and a drum cleaner 9 in this order.

The electric charger 4 is designed to charge the surface of the photosensitive drum 2 at a predetermined potential, and the developer roller 6 serves to supply toner onto the surface of the drum 2 so as to visualize a latent image formed thereon. The transfer charger 7 is designed to transfer a toner image thus formed on the photosensitive drum 2 onto a paper sheet serving as an image-transfer material, and the separation charger 8 serves to separate a paper sheet from the photosensitive drum 2. The drum cleaner 9 includes a blade 9b set in contact with the upper surface portion of the photosensitive drum 2, and serves to remove remaining toner on the drum 2 with the blade 9b. The surface of the photosensitive drum 2 charged as above is irradiated with a laser beam from a laser exposure device, not shown, as indicated by an arrow in the figure, and thus an electrostatic latent image is formed.

In the meantime, it is designed that paper sheets are conveyed upwards along a conveying path 14 vertically formed. The conveying path 14 extends upwards while passing through an image transfer unit 10 located between the photosensitive drum 2 and the transfer charger 7. On the conveying path 14, a pair of resist rollers 11 are provided at a site on an upstream side in the sheet conveying direction of the image transfer unit 10, and further a heat-roll type fixing device 13 is provided at a site on a downstream side in the sheet conveying direction.

The resist roller pair 11 temporarily stops a paper sheet conveyed to that point in order to correct the inclination of the sheet with respect to the sheet conveying direction, and align the leading end of the paper sheet with the leading end of the toner image formed on the photosensitive drum 2. The fixing device 13 serves to fix the toner image transferred onto the sheet, to the paper sheet itself.

Next, the printing operation of the above-described electronic photocopier will now be described.

First, the surface of the photosensitive drum 2, a back surface of the photosensitive layer of which is grounded to 0V, is charged by the electric charger 4 uniformly at −700V. After that, the laser exposure device is driven to scan the surface of the photosensitive drum 2 with a laser beam, and thus an electrostatic latent image is formed. The potential of the static latent image is about −100V. The latent image is set to face the developer roller 6 as the photosensitive drum 2 is rotated, and as toner is supplied thereto by the rotation of the developer roller 6 to which a potential of 300V is applied. In this manner, a toner image is formed from a latent image.

At the same time, paper sheets are fed out from a paper-feeding cassette not shown in the figure, and each sheet is conveyed along the conveyer path 14. Each sheet is aligned by the resist roller pair 11 and then introduced to the image transfer unit 10, where the toner image on the photosensitive drum 2 is transferred onto the paper sheet by the operation of the transfer charger 7. After a while, the sheet is sent to the fixing device 13, where the toner image is fixed via heat fusion onto the sheet. Then, after the fixation, the sheet is fed out.

After the above-described transfer of the toner image, remaining toner left out on the photosensitive drum 2 is removed with the blade 9b of the drum cleaner 9.

Figure 2:
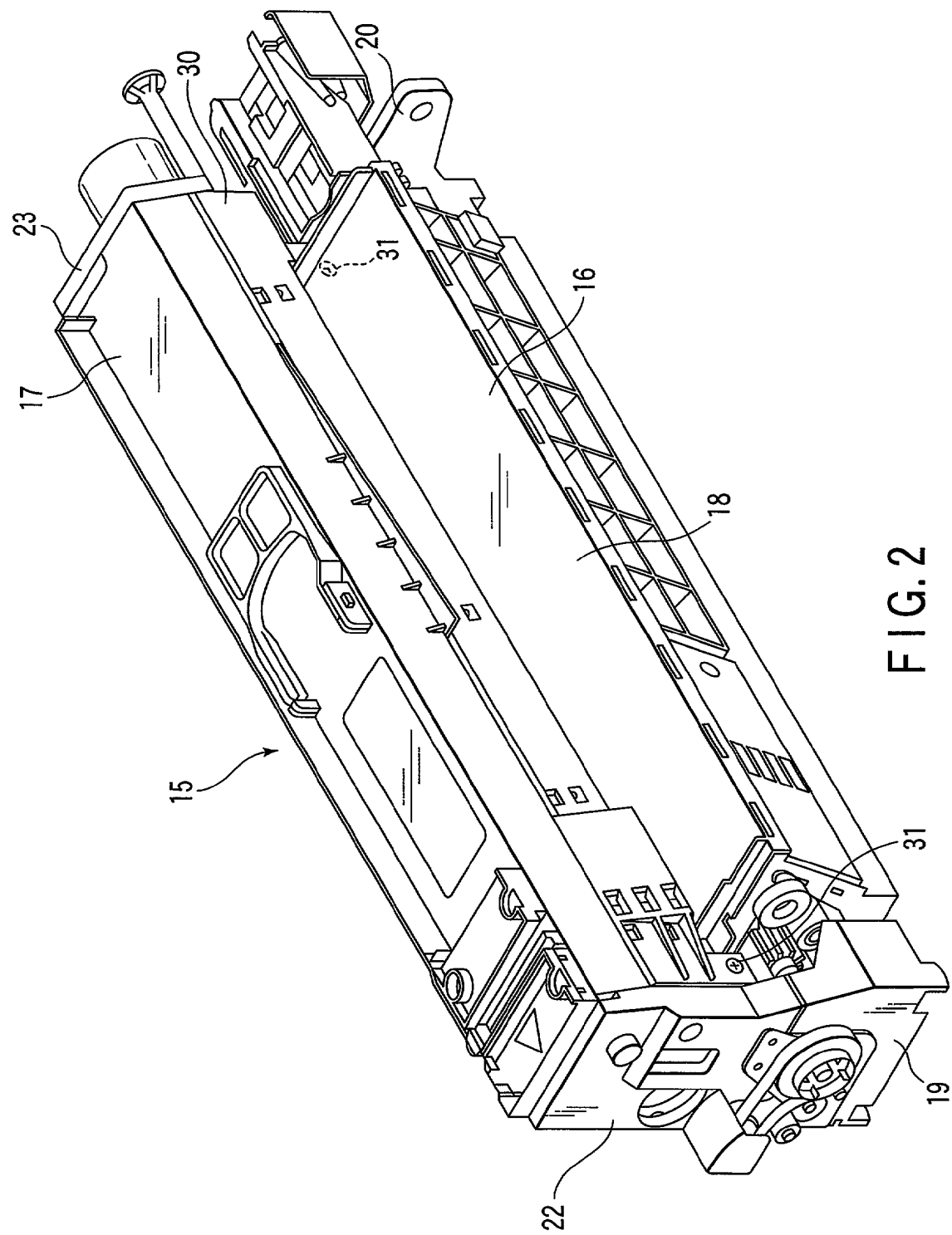
FIG. 2 is a perspective view showing a process unit including a developer unit and a drum unit.
Figure 3:
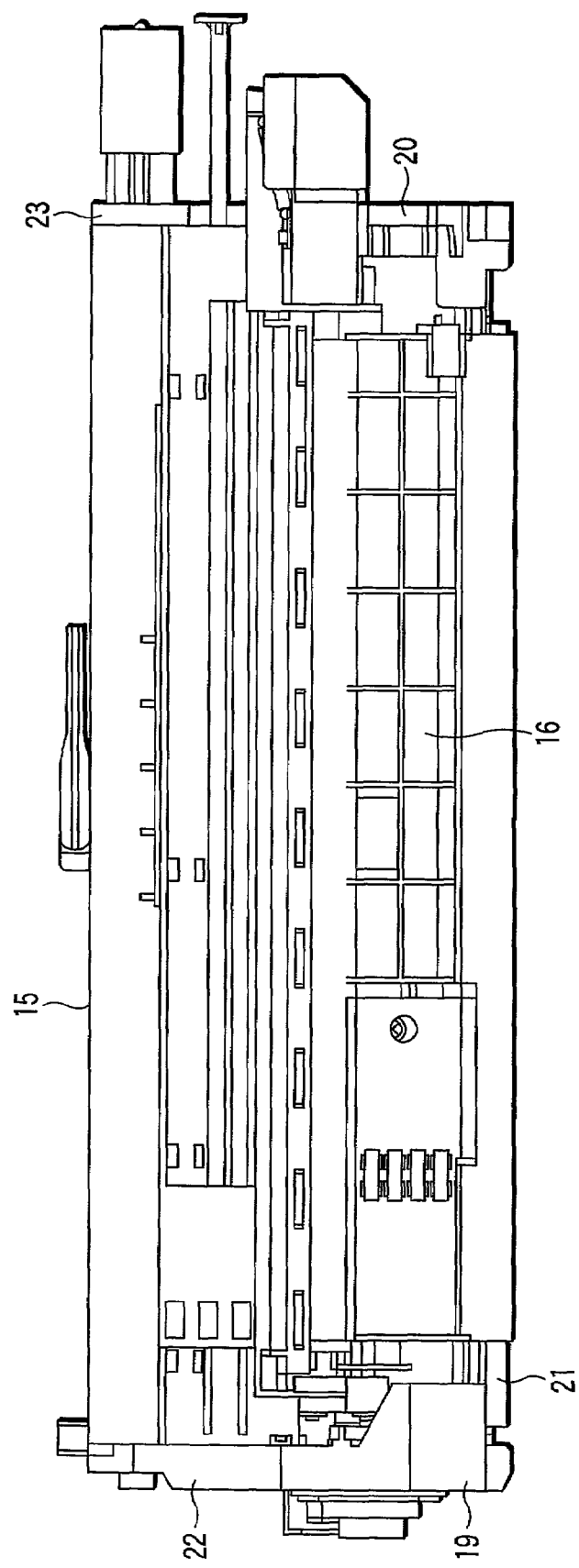
FIG. 3 is a front view showing the process unit including the developer unit and the drum unit.

FIG. 2 is a perspective view showing the drum unit 15 and the developer unit 16 which establish the process unit, and FIG. 3 is a front view thereof.

The drum unit 15 includes a casing 17 in which the photosensitive drum 2 can be rotatably mounted, and the developer unit 16 includes a casing 18 in which the developer roller 2 can be rotatably mounted. Both sides of the casing 18 of the developer unit 16 are supported by a bottom plate 21 via holding covers (to be called simply, covers) 19 and 20. Both sides of the casing 17 of the drum unit 15 are fixedly supported by the covers 19 and 20 of the developer unit 16 via covers 22 and 23.

Figure 5:
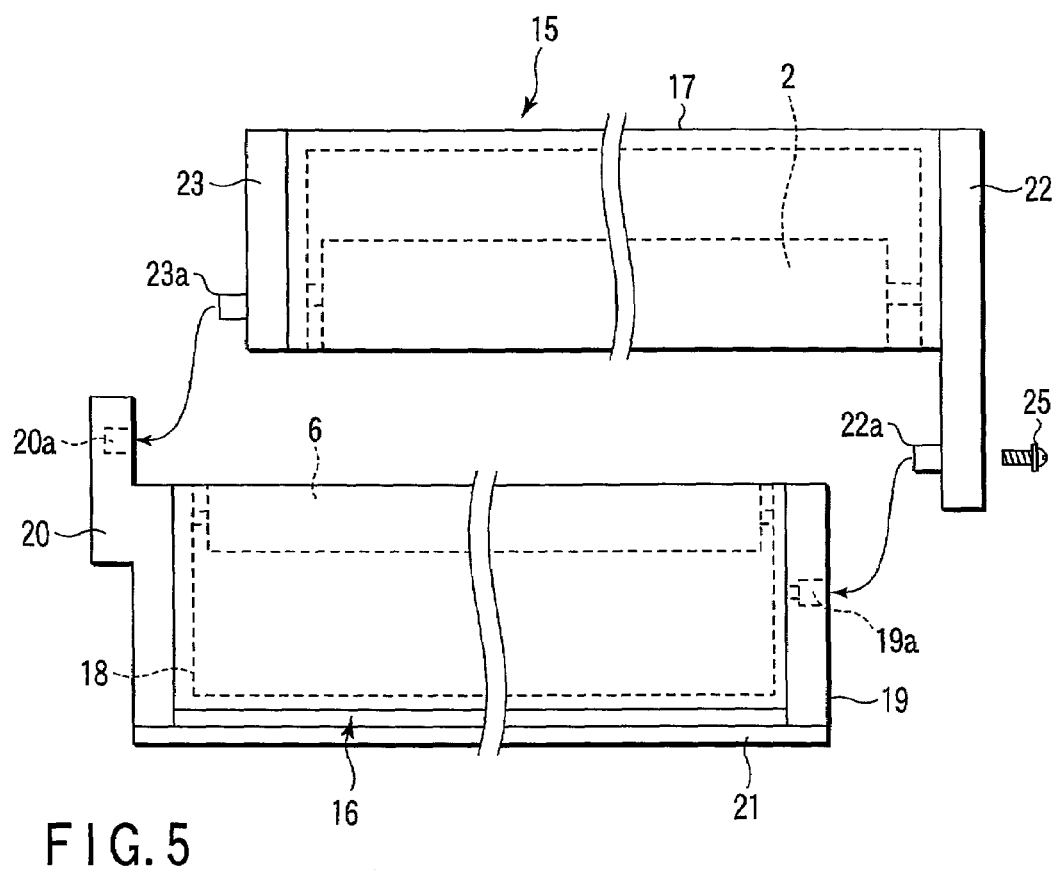
FIG. 5 is a front view showing the developer unit and the drum unit when they are separated from each other.

As shown in FIG. 5, the drum unit 15 and the developer unit 16 are structured to be separable from each other.

Figure 4:
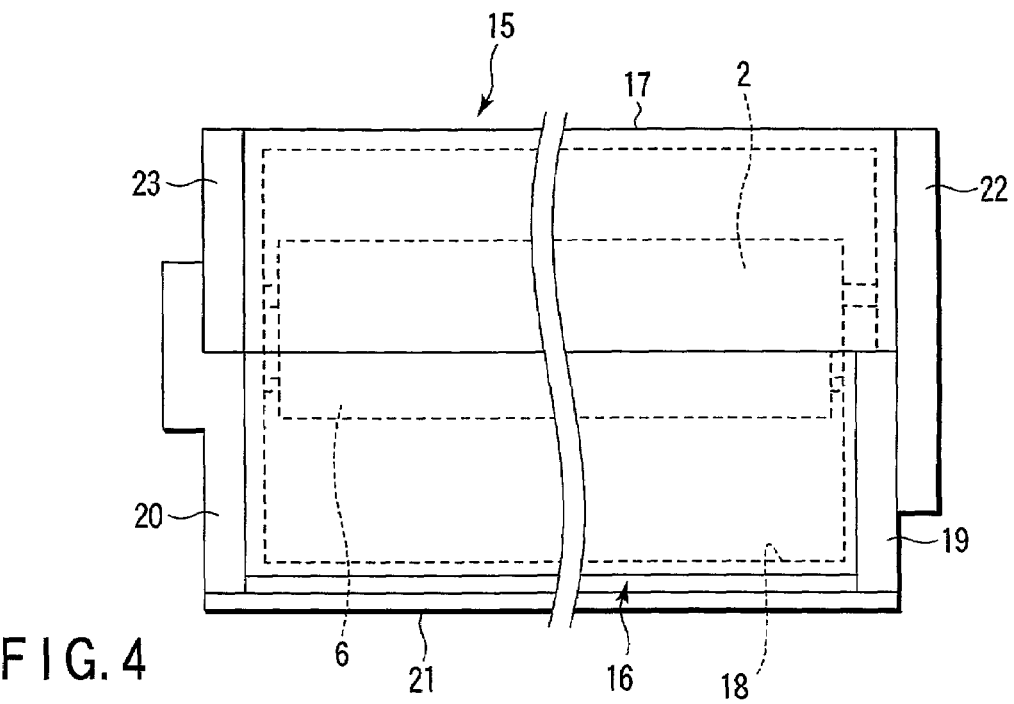
FIG. 4 is a front view showing the developer unit and the drum unit when they are assembled together.
Figure 6:
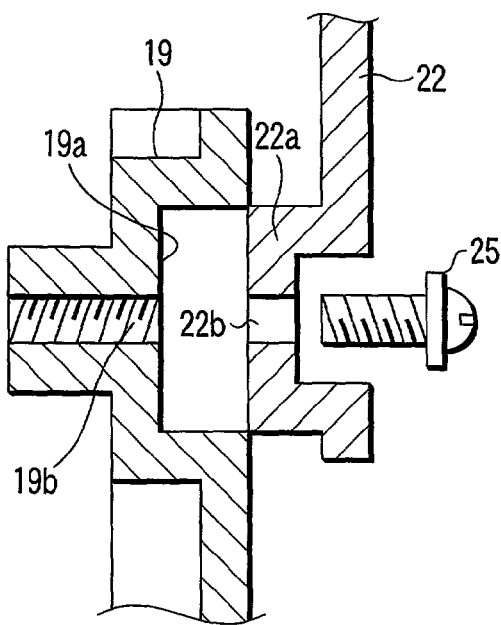
FIG. 6 is a cross sectional view of the casing of the developer unit and the drum unit, which illustrates project and recess portions made in the casing and a fixing tool which serves to fix the project and recess portions.

Projecting portions 22a and 23a are provided on the covers 22 and 23 of the drum unit 15, and on the other hand, recess portions 19a and 20a are formed in the covers 19 and 20 of the developer unit 16. The projecting portions 22a and 23a of the covers 22 and 23 of the drum unit 15 are detachably fit into the recess portions 19a and 20a of the covers 19 and 20 of the developer unit 16. As they are fit with each other, the drum unit 15 is aligned with respect to the developer unit 15. The cover 19 of the developer unit 16 and the cover 22 of the drum unit 15 are assembled together as an integrated body as shown in FIG. 4 as the central portions of the projecting and recess portions 19a and 22a fit with each other are fixed with a fixation screw 25 serving as a fixation tool. The central portions of the projecting and recess portions 19a and 22a are formed into a screw hole 19b and a through hole 22b through which the fixation screw is put, as shown in FIG. 6.

In order to assemble the drum unit 15 and the developer unit 16 together into a process unit, starting from the status shown in FIG. 5, the projecting portions 22a and 23a of the covers 22 and 23 of the drum unit 15 are respectively fit into the recess portions 19a and 20a of the covers 19 and 20 of the developer units 16 for alignment. After a while, the fixation screw 25 is screwed into the screw hole 19b of the recess portion 19a via the through hole 22b of the projecting portion 22a of the fixation screw 25. In this manner, the covers 19 and 22 are fixed together and the units are assembled into an integral body as shown in FIG. 4.

On the other hand, in order to separate the drum unit 15 and the developer unit 16 from each other for maintenance or the like, the fixation screw which fixes the cover 19 of the developer unit 16 and the cover 22 of the drum unit 15 together, is unscrewed. Then, the drum unit 15 is withdrawn to a lateral section, and thus the projecting portions 22a and 23a of the covers 22 and 23 of the drum unit 15 are detached from the recess portions 19a and 20a of the covers 19 and 20 of the developer unit 16, thus separating the units from each other.

As described above, the projecting portions 22a and 23a of the covers 22 and 23 of the drum unit 15 are respectively fit into the recess portions 19a and 20a of the covers 19 and 20 of the developer units 16 so as to align the drum unit 15 with respect to the developer unit 16. After the alignment, the fixation screw 25 is screwed for fixation into the central portions of the projecting and recess portions 19a and 22a, which are fit with each other. With this structure, the drum unit 15 will never be displaced from the aligned position even after the fixation of the drum unit 15. Thus, the alignment accuracy can be improved.

Figure 7:
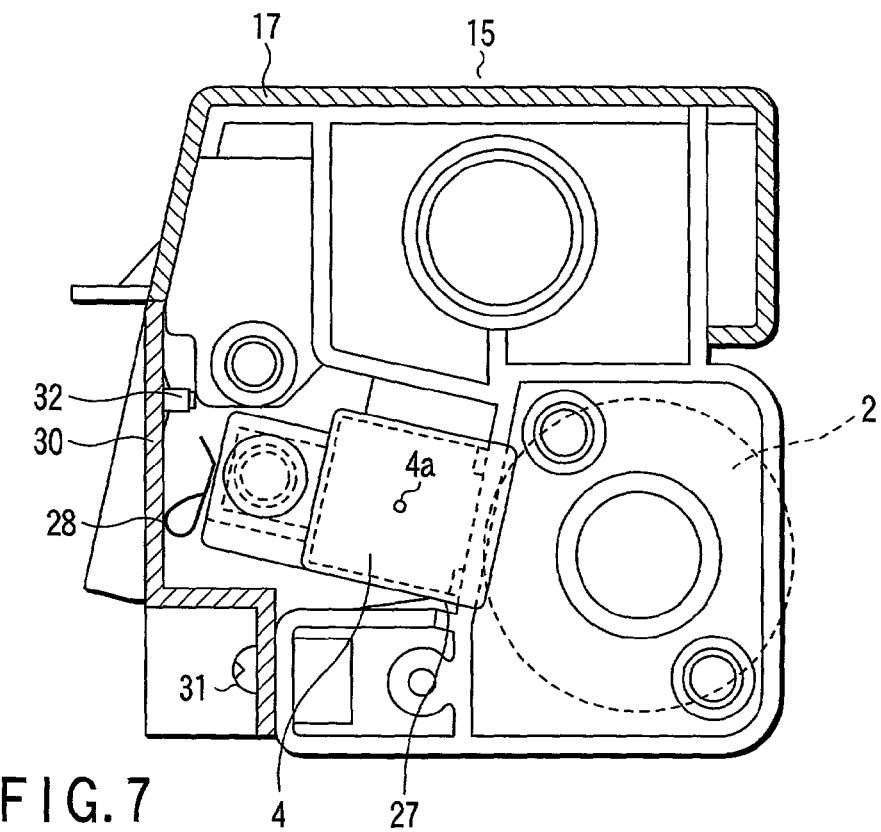
FIG. 7 is a cross sectional view of the drum unit, which illustrates the structure of how the electrical charger is held in the drum unit.

FIG. 7 is a diagram showing the structure in which the electrical charger is held in the drum unit.

Figure 8:
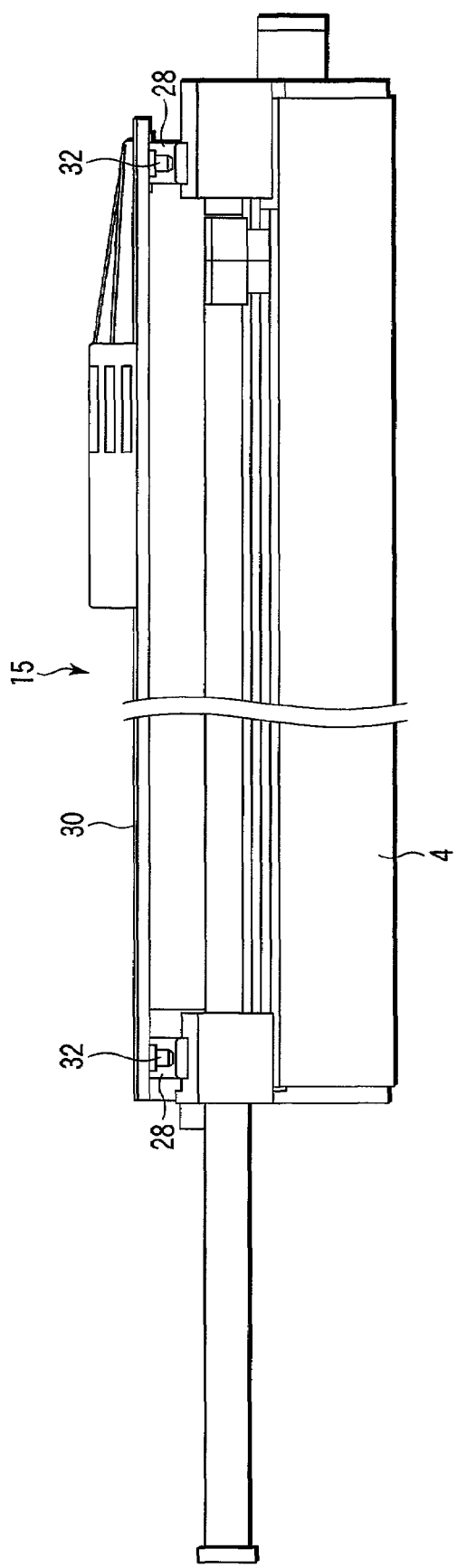
FIG. 8 is a plan view of the drum unit, which illustrates the structure of how the photosensitive drum is held in the drum unit.

An aligning unit 27 for aligning the electrical charger 4 is provided in the casing 17 of the drum unit 15. Both end portions of the electric charger 4 are held at the aligning unit 27 with pressure as being urged by plate springs 28 serving as urging members, as can be also seen in FIG. 8.

The back surface side of the casing 17 is opened, and the opening portion is sealed such as to be openable with a back surface cover 30. The back surface cover 30 is fixed to the casing 17 by a fixation screw 31. The plate springs 28 are mounted to an inner surface portion of the back surface cover 30 by means of a mounting tool 32.

The electric charger 4 charges the photosensitive drum 2 by way of corona discharge. Therefore, there is a certain limitation of life for a discharge wire 4a until it is used up, and therefore the wire must be replaced at regular intervals. Or even if the discharge wire 4a is not yet used up to its lifetime, it is in some cases necessary to replace the wire because it may be excessively stained depending on the environment where it is used.

Next, the replacement of the electric charger 4 will now be described.

For replacement of the charger, first, the fixation screw 31 of the back surface cover 30 is unscrewed to uncover the back surface cover 30. After a while, the operator is supposed to put his/her hand in the casing 17 of the drum unit 15, and manually pull out the electric charger 4. After pulling out the electric charger 4 as described above, a new electric charger 4 is inserted to the casing 17 of the drum unit 15, and both end portions of the charger are set in the aligning unit 27. Then, the back surface cover 30 is fixedly mounted to the casing 17 of the drum unit 15 with a fixation screw 31. In this manner, both end portions of the electric charger 4 are elastically pressed by the plate springs 28 of the back surface cover 30, and thereby the charger is held by the aligning portion 27 while being aligned.

As described above, by simply removing the back surface cover 30, the electric charger 4 can be taken out. Thus, with the present invention, it is no longer necessary to remove the side surface covers and therefore it becomes easy to replace the electric charger 4 with a new one.

Figure 9:
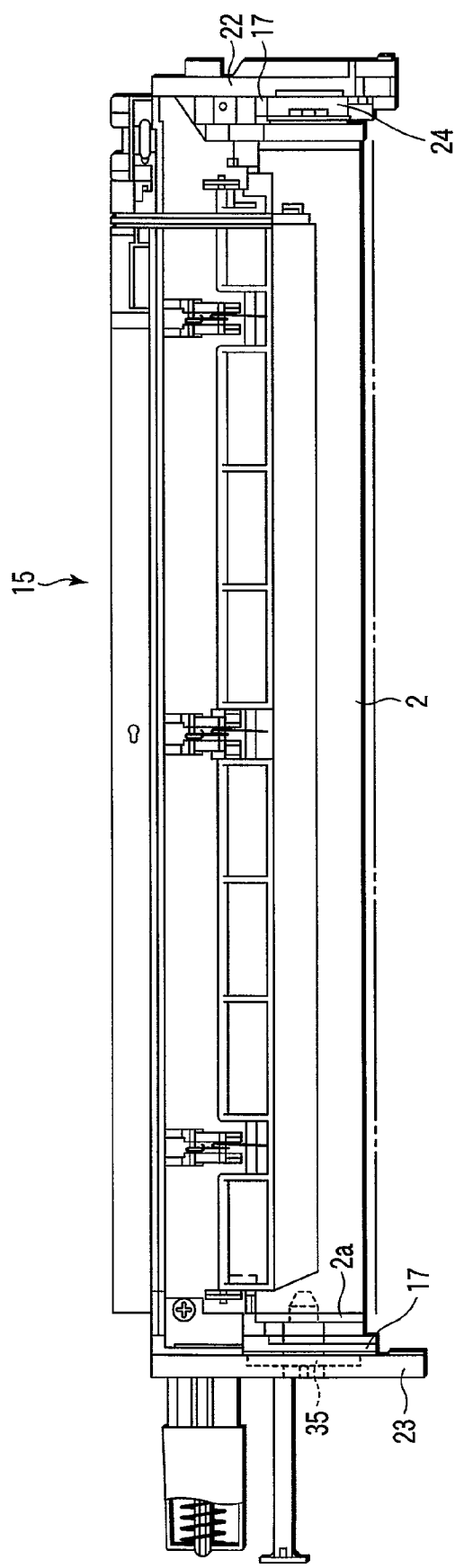
FIG. 9 is a plan view of the drum unit, which illustrates the structure of how the electrical charger is held in the drum unit.
Figure 10:
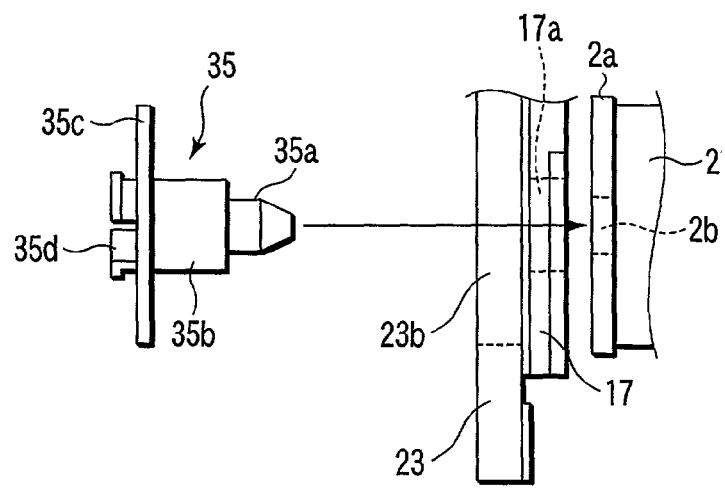
FIG. 10 is a view showing a holding tool for the photosensitive drum.

FIG. 9 is a plan view of the drum unit 15, illustrating how the photosensitive drum 2 is held in the unit.

One end of the photosensitive drum 2 is rotatably supported via a bearing portion 24 on one side surface portion of the casing 17, whereas the other end of the drum is rotatably supported on the other side surface portion of the casing 17 via a supporting tool 35 which also serves as a bearing. The support tool 35 pierces through the cover 23 of the drum unit 15 from the outer side of the cover, and further pierces through the side surface portion of the casing 17 so as to rotatably hold the center of a flange portion 2a of the photosensitive drum 2.

The support tool 35 includes a small diameter portion 35a, a large diameter portion 35b, a collar stopper portion 35c and a head portion 35d. The small diameter portion 35a of the support tool 35 is inserted to be slidable to a center hole 2b of the flange portion 2a of the photosensitive drum 2. Meanwhile, the large diameter portion 35b is screwed into an aligning hole 17a of the case 17.

The photosensitive drum 2 wears off as the number of printings increases, and therefore there is a usable lifetime for the drum. When the lifetime of the drum comes, it must be replaced with a new one.

Next, the replacement of the photosensitive drum 2 will now be described. In order to replace the drum, first, the drum unit 17 is separated from the developer unit 16 in a similar manner to that described in connection with FIG. 5. After a while, the support tool 35 is loosened from the cover 23 of the drum unit 17 from its outer side, and extracted therefrom. Thus, the held flange portion 2a of the photosensitive drum 2 is released. Then, as the flange portion 2a is pulled diagonally downwards, the other end portion of the photosensitive drum 2 is disengaged from the bearing portion of the casing 17, and thus the drum can be dismounted.

After dismounting the photosensitive drum 2, a new photosensitive drum 2 is inserted to the drum unit 17 from its end portion side so as to support the new drum in the bearing portion 24. Then, the flange portion 2a is pushed into the drum unit 17 so as to make the flange portion face a screw hole 17a of the casing 17. After a while, the support tool 35 is screwed into the screw hole 17a of the case 17 from the outer side of the cover 23 via a through hole 23b, of the cover 23, and thus the small diameter portion 35a of the tool is fit into the center hole 2b of the flange portion 2a of the photosensitive drum 2. In this manner, the photosensitive drum 2 can be rotatably held.

With the structure described above, the support tool 35 which supports the flange portion 2a of the photosensitive drum 2 can be attached or detached from the outer side of the cover 23, and therefore it becomes unnecessary to dismount the cover 23 of the drum unit 15 and then mount it back when replacing the photosensitive drum 2. Thus, the replacing work can be facilitated.

Figure 12:
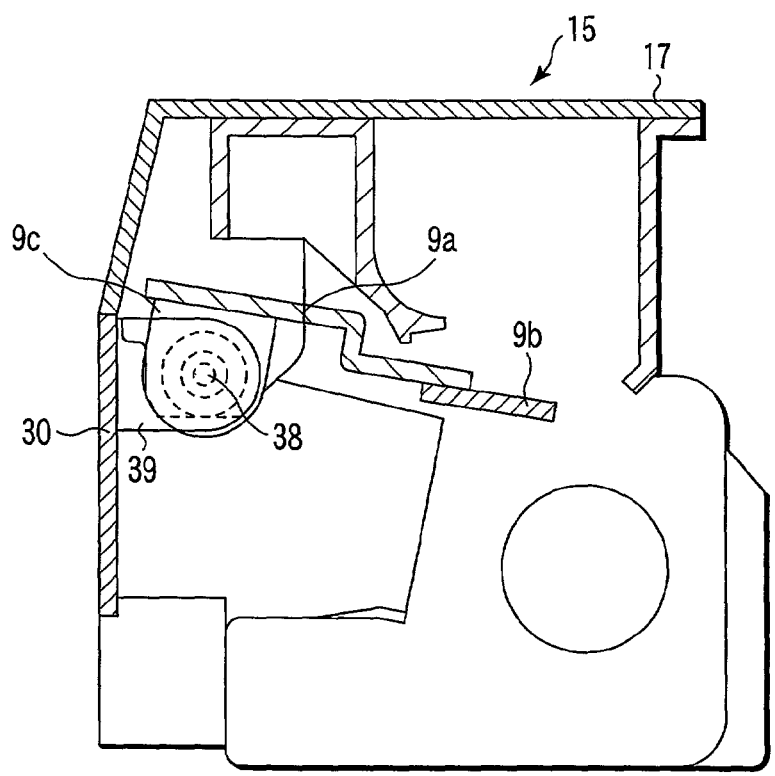
FIG. 12 is a cross sectional view taken along the line A—A indicated in FIG. 11.
Figure 11:
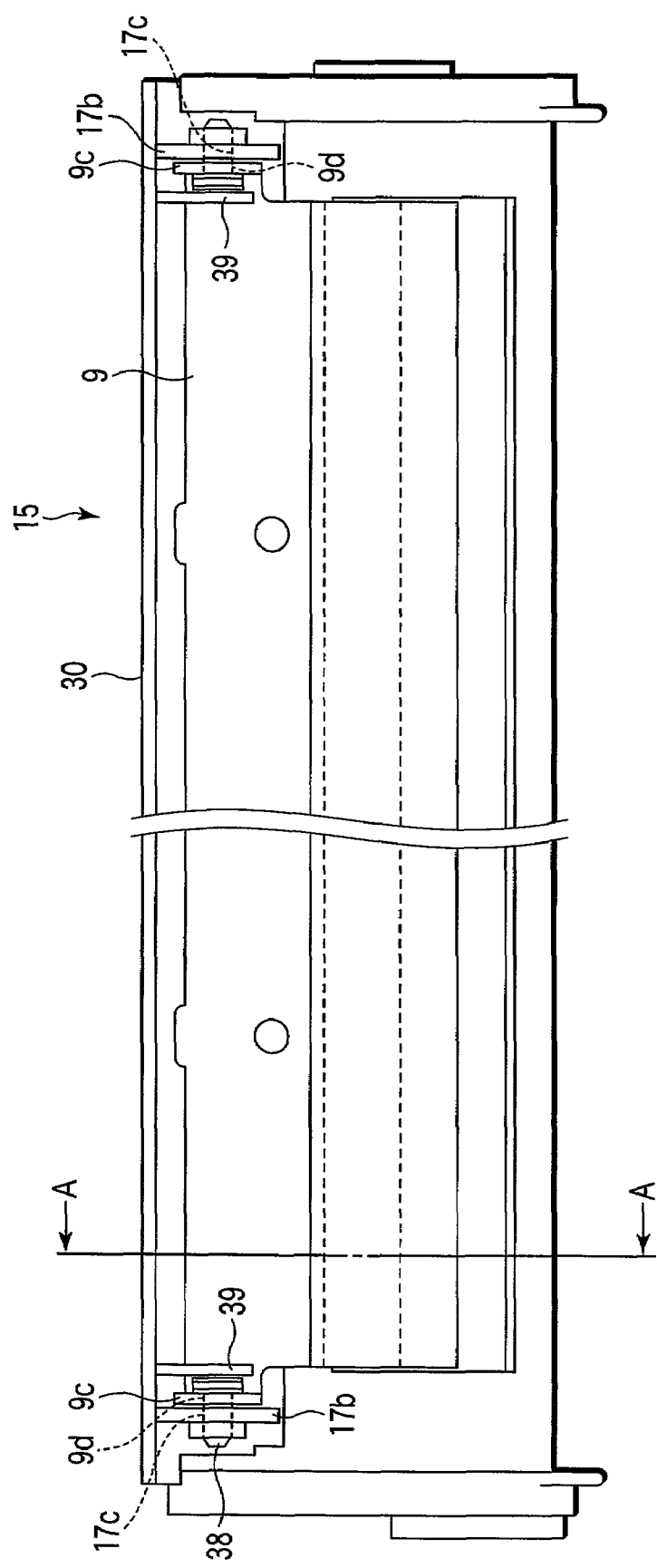
FIG. 11 is a plan view of the drum unit, which illustrates the structure of how the cleaning blade is held in the drum unit.

FIG. 11 is a plan view of the drum unit 15, which illustrates the structure of how the cleaning blade is held in the unit. FIG. 12 is a cross sectional view taken along the line A—A indicated in FIG. 11.

The drum cleaner 9 includes a substrate 9a and a blade 9b mounted on the substrate 9a such as to be brought into contact with the photosensitive drum 2.

Both end portions of the substrate 9a have bent pieces 9c formed thereon, and these bent pieces 9c are rotatably supported on a mount portion 17b of the casing 17 via the support pins 38. Holder pieces 39 are provided to project out from both sides portions of the inner surface of the back surface cover 30, and these holder pieces 39 respectively hold head portions of the support pins 38 with pressure. Each of the bent pieces 9c and the mount portion 17b have through holes 9d and 17c, respectively, made in these members, through which the respective support pin 38 is put.

The blade 9b of the drum cleaner 9 wears off as it is used, and therefore there is a usable lifetime for the blade. When the lifetime of the blade comes, it must be replaced with a new one.

Next, the replacement of the drum cleaner 9 will now be described. In order to replace the cleaner, first, the drum unit 15 is separated from the developer unit 16 in a similar manner to that described in connection with FIG. 5. After a while, the fixation screw 31 is unscrewed from the back surface cover 30, and thus the back surface cover 20 is separated from the casing 17. With this operation, the holder pieces 39 of the back surface cover 30 are disengaged from the head portions of the support pins 38, and thus the support pins 38 being held with pressure are released. After the release, the support pins 38 are extracted from the bent pieces 9c and the mount portions 17b of the casing 17, and thus the drum cleaner 9 is removed from the casing 17.

After that, a new drum cleaner 9 is inserted to the drum unit 15, and the bent pieces 9c at both end portions of the cleaner are set to face the mount portions 17b of the casing 17. Subsequently, the support pins 38 are pierced through the through holes 9d of the bent pieces 9c of the drum cleaner 9 and the through holes 17c of the mount portions 17b of the casing 17. Then, the back surface cover 30 is mounted onto the case casing 17. As described above, the head portions of the support pins 38 are held with pressure by the holder pieces 39 of the back surface cover 30, and thus the drum cleaner 9 is mounted.

With the structure described above, the drum cleaner 9 can be replaced by detaching the back surface cover 30 and attaching it back, and therefore it becomes unnecessary to dismount the side surface covers for replacing the cleaner. Thus, the replacing work for the drum cleaner 9 can be facilitated.

According to the above-described embodiment of the present invention, the maintenance of the photosensitive drum 2, the electric charger 4 and the drum cleaner 9 can be significantly facilitated. Therefore, unlike the conventional cases, it is no longer necessary to discard the entire drum unit (kit) 15 at the end of the life of the photosensitive drum 2 only, and therefore the drum unit 15 can be used for a longer life than those of the conventional cases.

The above-described advantage also leads to the decrease in the amount of the waste materials, as well as the lowering of the operation cost per the total number of printings.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process unit comprising:
    an image carrier unit configured to mount an image carrier, which carries an electrostatic latent image, onto a casing;
    a first image carrier unit holder cover configured to hold a first side surface portion of the image carrier unit;
    a second image carrier unit holder cover configured to hold a second side surface portion of the image carrier unit;
    a developer unit configured to mount a developer roller, which develops the electrostatic latent image, onto the casing;
    a first developer unit holder cover configured to hold a first side surface portion of the developer unit;
    a second developer unit holder cover configured to hold a second side surface portion of the developer unit;
    first and second projecting members arranged at the first and second image carrier unit holder covers, respectively;
    first and second recess portions formed in the first and second developer unit holder covers, respectively, wherein the first projecting member is engaged with the first recess portion and the second projecting member is engaged with the second recess portion by moving the projecting members with respect to the recess portions along a longitudinal direction of the image carrier unit and the developer unit; and
    at least one fixation tool configured to fix at least one of: the first projecting member to the first recess portion, and the second projecting member to the second recess portion.

2. A process unit according to claim 1, further comprising:
    at least one support tool which is mounted on at least one of the first and second image carrier unit holder covers from an outer side thereof, and which is configured to pierce through the at least one image carrier unit holder cover and the casing so as to rotatably support a center of at least one end portion of the image carrier.

3. A process unit according to claim 2, wherein the image carrier unit comprises a flange having a through hole, the support tool member comprises a pin portion which is insertable in the through hole of the flange such that the support tool member and the image carrier are engaged with each other, and the image carrier is movable diagonally downwards from the image carrier unit after the support tool member is detached from the image carrier.

4. A process unit according to claim 1, further comprising:
    a cleaning member provided in the image carrier unit and configured to remove a remaining portion of a developing agent left over on the image carrier after transfer of a developer image formed on the image carrier;

a cleaning member support tool configured to support both end portions of the cleaning member with respect to the casing of the image carrier unit; and a cover member which is detachably mounted on the image carrier unit, and which is provided with a holder piece on an inner surface side, thereof to hold and apply pressure to the support tool of the cleaning member.

5. A process unit comprising:

an image carrier unit configured to mount an image carrier, which carries an electrostatic latent image, onto a casing;

a first image carrier unit holder cover configured to hold a first side surface portion of the image carrier unit;

a second image carrier unit holder cover configured to hold a second side surface portion of the image carrier unit;

a developer unit configured to mount a developer roller, which develops the electrostatic latent image, onto the casing;

a first developer unit holder cover configured to hold a side surface portion of the developer unit;

a second developer unit holder cover configured to hold a second side surface portion of the developer unit;

first and second projecting members arranged at the first and second image carrier unit holder covers, respectively;

first and second recess portions formed in the first and second developer unit holder covers, respectively, wherein the first projecting member is engaged with the first recess portion and the second projecting member is engaged with the second recess portion by moving the projecting members with respect to the recess portions along a longitudinal direction of the image carrier unit and the developer unit;

at least one fixation tool configured to fix at least one of: the first projecting member to the first recess portion, and the second projecting member to the second recess portion;

an electric charger device provided in the image carrier unit and configured to charge a surface of the image carrier;

an aligning portion configured to align the electric charger device within the image carrier unit;

a cover member detachably mounted on the image carrier unit and configured to cover an opposite side of the electric charger device with respect to the image carrier; and an urging member provided on the cover member and configured to hold the electric charger device by urging it with pressure in an aligning portion.

6. A process unit according to claim 5, wherein the urging member comprises plate springs which apply pressure to both end portions of the charger device.

7. A process unit according to claim 5, further comprising:

at least one support tool which is mounted on at least one of the first and second image carrier unit holder covers from an outer side thereof, and which is configured to pierce through the at least one image carrier unit holder cover and the casing so as to rotatably support a center of at least one end portion of the image carrier.

8. A process unit according to claim 7, wherein the image carrier unit comprises a flange having a through hole, the support tool member comprises a pin portion which is insertable in the through hole of the flange such that the support tool member and the image carrier are engaged with each other, and the image carrier is movable diagonally downwards from the image carrier unit after the support tool member is detached from the image carrier.

9. A process unit according to claim 5, further comprising:

a cleaning member provided in the image carrier unit and configured to remove a remaining portion of a developing agent left over on the image carrier after transfer of a developer image formed on the image carrier; and a cleaning member support tool configured to support both end portions of the cleaning member with respect to the casing of the image carrier unit;

wherein the cover member that is detachably mounted on the image carrier unit is provided with a holder piece on an inner surface side thereof to hold and apply pressure to the support tool of the cleaning member.

10. A process unit according to claim 5, wherein the electric charger is removable from the image carrier unit after the cover member is detached from the image carrier unit, while the first and second projecting members are engaged with the first and second recess portions and while the at least one fixation tool is fixing the at least one of: the first projecting member to the first recess portion, and the second projecting member to the second recess portion.

11. An image forming apparatus comprising:

(i) a process unit removably provided therein, said process unit comprising:

an image carrier unit configured to mount an image carrier, which carries an electrostatic latent image, onto a casing;

a first image carrier unit holder cover configured to hold a first side surface portion of the image carrier unit;

a second image carrier unit holder cover configured to hold a second side surface portion of the image carrier unit;

a developer unit configured to mount a developer roller, which develops the electrostatic latent image, onto the casing;

a first developer unit holder cover configured to hold a first side surface portion of the developer unit;

a second developer unit holder cover configured to hold a second side surface portion of the developer unit;

first and second projecting members arranged at the first and second image carrier unit holder covers, respectively;

first and second recess portions formed in the first and second developer unit holder covers, respectively, wherein the first projecting member is engaged with the first recess portion and the second projecting member is engaged with the second recess portion by moving the projecting members with respect to the recess portions along a longitudinal direction of the image carrier unit and the developer unit; and at least one fixation tool configured to fix at least one of: the first projecting member to the first recess portion, and the second projecting member to the second recess portion; and (ii) a fixing unit configured to fix to a sheet material a developer image that has been transferred onto the sheet material.

12. An image forming apparatus according to claim 11, wherein the process unit further comprises:

at least one support tool which is mounted on at least one of the first and second image carrier unit holder covers from an outer side thereof, and which is configured to pierce through the at least one image carrier unit holder cover and the casing so as to rotatably support a center of at least one end portion of the image carrier.

13. An image forming apparatus according to claim 12, wherein the image carrier unit comprises a flange having a through hole, the support tool member comprises a pin portion which is insertable in the through hole of the flange such that the support tool member and the image carrier are engaged with each other, and the image carrier is movable diagonally downwards from the image carrier unit after the support tool member is detached from the image carrier.

14. An image forming apparatus according to claim 11, wherein the process unit further comprises:
   a cleaning member provided in the image carrier unit and configured to remove a remaining portion of a developing agent left over on the image carrier after transfer of the developer image from on the image carrier;
   a cleaning member support tool configured to support both end portions of the cleaning member with respect to the casing of the image carrier unit; and
   a cover member which is detachably mounted on the image carrier unit, and which is provided with a holder piece on an inner surface side thereof to hold and apply pressure to the support tool of the cleaning member.

15. An image forming apparatus according to claim 11, wherein the process unit further comprises:
   an electric charger device provided in the image carrier unit and configured to charge a surface of the image carrier;
   an aligning portion configured to align the electric charger device within the image carrier unit;
   a cover member detachably mounted on the image carrier unit and configured to cover an opposite side of the electric charger device with respect to the image carrier; and
   an urging member provided on the cover member and configured to hold the electric charger device by urging it with pressure in an aligning portion.

16. An image forming apparatus according to claim 15, wherein the electric charger is removable from the image carrier unit after the cover member is detached from the image carrier unit, while the first and second projecting members are engaged with the first and second recess portions and while the at least one fixation tool is fixing the at least one of: the first projecting member to the first recess portion, and the second projecting member to the second recess portion.

* * * * *